United States Patent
Minowa et al.

[11] Patent Number: 5,913,747
[45] Date of Patent: Jun. 22, 1999

[54] HYDRAULIC CONTROL APPARATUS FOR AN AUTOMATIC TRANSMISSION OF A VEHICLE

[75] Inventors: Toshimichi Minowa, Mito; Tatsuya Ochi, Hitachi; Ryoichi Naganuma, Hitachinaka, all of Japan

[73] Assignee: Hitachi, Ltd., Japan

[21] Appl. No.: 08/871,965

[22] Filed: Jun. 10, 1997

[30] Foreign Application Priority Data

Jun. 10, 1996 [JP] Japan .................................. 8-146980

[51] Int. Cl.⁶ .................................................. F16H 61/00
[52] U.S. Cl. .......................................... 477/117; 477/127
[58] Field of Search .................................. 477/121, 127, 477/131, 116, 117

[56] References Cited

U.S. PATENT DOCUMENTS

| | | | |
|---|---|---|---|
| 4,616,531 | 10/1986 | Ogasawara et al. | 477/117 |
| 4,628,774 | 12/1986 | Iwanaga | 477/117 |
| 4,899,624 | 2/1990 | Bota et al. | 477/117 |
| 5,425,688 | 6/1995 | Raszkowski | 477/127 X |
| 5,433,124 | 7/1995 | Person | 477/131 X |
| 5,651,751 | 7/1997 | Jang | 477/117 |

FOREIGN PATENT DOCUMENTS

| | | |
|---|---|---|
| 2-42252 | 2/1990 | Japan . |
| 5-10426 | 1/1993 | Japan . |

*Primary Examiner*—Khoi Q. Ta
*Attorney, Agent, or Firm*—Evenson, McKeown, Edwards & Lenahan, P.L.L.C.

[57] ABSTRACT

A hydraulic control apparatus for an automatic transmission accurately controls a variation in torque generated when a shift lever is turned from an N range into a D range or R range. The hydraulic control apparatus has a pressure governor for hydraulic pressure to be supplied from a spool valve to a clutch, by an actuator, thereby suppressing a variation in output torque of the automatic transmission. The hydraulic pressure governed by the actuator is introduced into the spool valve again, and it is supplied to a forward clutch and a reverse clutch through a hydraulic line switch for switching hydraulic lines communicated to the forward clutch and the reverse clutch from each other.

9 Claims, 7 Drawing Sheets

A···PUMP PRESSURE
B···INPUT PRESSURE OF F/R SOLENOID
C···OUTPUT PRESSURE OF F/R SOLENOID
D···PRESSURE SUPPLIED TO FORWARD CLUTCH
E···PRESSURE SUPPLIED TO REVERSE CLUTCH

A ··· PUMP PRESSURE
B ··· INPUT PRESSURE OF F/R SOLENOID
C ··· OUTPUT PRESSURE OF F/R SOLENOID
D ··· PRESSURE SUPPLIED TO FORWARD CLUTCH
E ··· PRESSURE SUPPLIED TO REVERSE CLUTCH

| POSITION OF SHIFT LEVER \ KIND OF CLUTCHES | F/C | 2-4/C | H/C | R/C | LO/C |
|---|---|---|---|---|---|
| NEUTRAL & PARKING | | | | | |
| D(FIRST RANGE) | ○ | | | | ○ |
| D(SECOND RANGE) | ○ | ○ | | | |
| D(THIRD RANGE) | ○ | | ○ | | |
| D(FOURTH RANGE) | | ○ | ○ | | |
| REVERSE RANGE | | | | ○ | |

FIG.8

| POSITION OF SHIFT LEVER \ KIND OF CLUTCHES | (F/C) FORWARD CLUTCH | (P/P) PULLEY PRESSURE | (L/P) LINE PRESSRE | (R/C) REVERSE CLUTCH | (S/C) START CLUTCH |
|---|---|---|---|---|---|
| NEUTRAL & PARKING | | ○ | ○ | | |
| DRIVE RANGE | ○ | ○ | ○ | | ○ |
| REVERSE RANGE | | ○ | ○ | ○ | ○ |

# HYDRAULIC CONTROL APPARATUS FOR AN AUTOMATIC TRANSMISSION OF A VEHICLE

BACKGROUND AND SUMMARY OF THE INVENTION

The present invention relates to an apparatus for controlling a hydraulic pressure used for speed change performed by an automatic transmission of an automobile, and particularly to a hydraulic control apparatus for an automatic transmission which is intended to directly control a hydraulic pressure to be supplied to a clutch on the basis of an electric signal.

The control apparatus of this type has been known, for example, from Nissan's maintenance guide titled "Full Range Electronically Controlled Automatic Transmission" issued by NISSAN MOTOR on March, 1987. In this control apparatus, an accumulator is disposed between a manual spool valve and a forward clutch and another accumulator is disposed between the above spool valve and a reverse clutch. Another known hydraulic control apparatus generates a variation in torque of an output shaft of an automatic transmission when the position of a shift lever of an automobile is changed between an N (Neutral) range and a D (Drive: forward) range or between the N range, and an R (Reverse) range is relaxed by mechanically and electrically controlling a line pressure introduced in the above spool valve. At the present time, the hydraulic control apparatus having such a structure has been extensively used for automobiles.

The above-described prior art hydraulic control apparatus, however, is disadvantageous in that provision of two accumulators for forward and reverse clutches makes larger the size of a transmission using the control apparatus, and that the accuracy of control for suppressing a variation in torque is deteriorated due to changes in mechanical components with time.

SUMMARY OF THE INVENTION

An object of the present invention is to provide a hydraulic control apparatus for an automatic transmission, which is improved in accurately suppressing a variation in torque generated when the position of a shift lever of an automobile is changed between an N range and a D range or between the N range and an R range and in preventing the accuracy of control for suppressing a variation in torque from being deteriorated due to changes of mechanical components with time, by adopting a control system using a perfectly electronic circuit in place of a control system using a hydraulic circuit.

To achieve the above object, according to the present invention, there is provided a hydraulic control apparatus for an automatic transmission, including: a means for generating a hydraulic pressure by driving a hydraulic pump using an engine drive force or an electric force; a spool valve automatically or manually driven by operation of a speed change lever; at least one clutch used for forward movement, reverse movement or speed change of a vehicle; a hydraulic control actuator for governing a hydraulic pressure applied to the clutch; and a control means for controlling the hydraulic control actuator; characterized by providing a pressure governing means for governing a hydraulic pressure, which is supplied from the hydraulic pressure generating means to the clutch through the spool valve, by the hydraulic control actuator to suppress a variation in output torque of the automatic transmission. In the above hydraulic control apparatus, preferably, the hydraulic pressure governed by the actuator is supplied to the forward clutch and the reverse clutch through a hydraulic line switching means for switching hydraulic lines communicated to the forward clutch and the reverse clutch from each other.

BRIEF DESCRIPTION OF THE DRAWINGS

FIG. 8 is a correlation diagram showing a relationship between positions of a shift lever and engagement of CVT clutches and supply of a hydraulic pressure to a pulley.

DETAILED DESCRIPTION OF THE PREFERRED EMBODIMENTS

Hereinafter, embodiments of the present invention will be described in detail with reference to the accompanying drawings.

Figure 1:
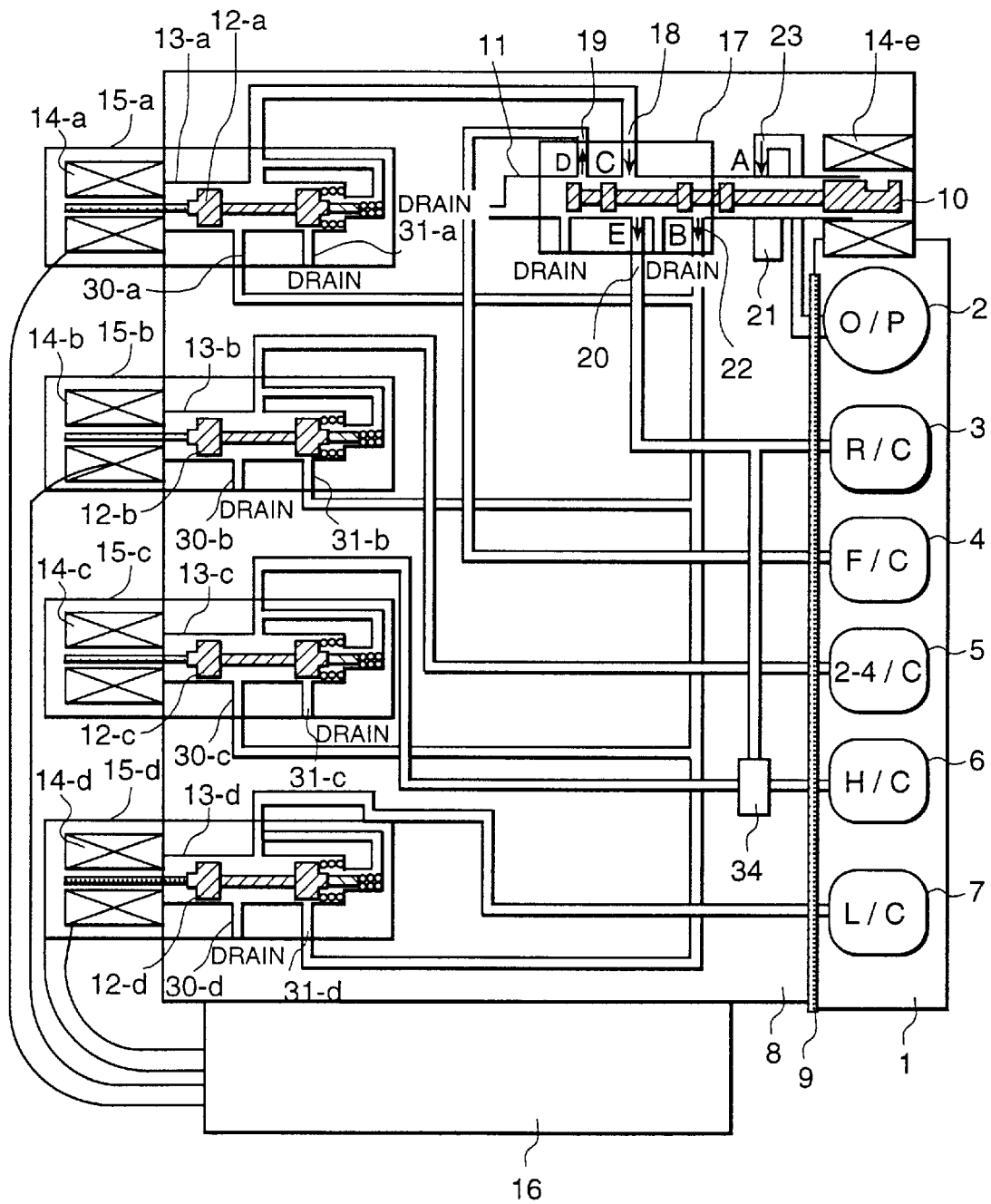
FIG. 1 is a view showing a schematic configuration of a hydraulic control apparatus for an automatic transmission according to the present invention.

FIG. 1 is a view showing a schematic configuration of a hydraulic control apparatus for an automatic transmission according to one embodiment of the present invention. In this embodiment, there is used a four-speed automatic transmission.

A transmission main body 1 includes an oil pump 2 for generating a hydraulic pressure; a reverse clutch (hereinafter, referred to as a "R/C") 3 turned on for reverse movement; a forward clutch (F/C) 4 turned on for forward movement; a 2–4 clutch (2–4/C) 5 turned on for speed change into a second and fourth speed; a high clutch (H/C) 6 turned on for speed change into a third and fourth speed; and a lock-up clutch (L/C) 7. The turning on/off of these clutches changes a rotating ratio of a planetary gear (not shown) to carry out starting, reverse movement, or speed change, thereby allowing a vehicle to run desirably.

The transmission main body 1 is connected to a hydraulic control apparatus 8 through an interface board 9. The use of the interface board 9 reduces the production cost of the hydraulic control apparatus 8. The reason for this is as follows. Even if design factors (the entire shape thereof, positions of portions for introducing a hydraulic pressures to clutches, and the like) of the transmission main body 1 are not matched with design factors (the arrangement of outlets of hydraulic lines) of the hydraulic control apparatus 8, the same hydraulic control apparatus 8 can be matched with the transmission main body 1 by changing the shape of the interface board 9 in accordance with the kind of the transmission main body 1.

The hydraulic control apparatus 8 includes a manual spool valve 10 and a manual spool valve chamber 11. It also includes hydraulic control actuators 15, each of which is composed of a hydraulic control valve 12, a hydraulic control valve chamber 13, and an electromagnetic solenoid 14. The electromagnetic solenoid 14 is driven by a transmission controller 16 mounted on the hydraulic control apparatus 8. The number of sets of the hydraulic control actuators 15 differs depending on the number of the clutches provided in the transmission main body 1. In the prior art apparatus, the number of mechanical control means corresponds to that of clutches; however, according to the present invention, only four sets of the actuators may be provided for the four-speed automatic transmission.

The function of the hydraulic control apparatus 8 having the above configuration will be described in detail below. When a shift lever (which will be described later) of an automobile is operated, a hydraulic pressure generated by the oil pump 2 driven by an engine power or an electric motor is introduced into the manual spool valve 10 operated by manually or automatically from a pump pressure input hydraulic line 23 (the hydraulic pressure is indicated by character A). In the case where the manual spool valve 10 is automatically operated, it is desired to be driven by an electromagnetic solenoid 14-e from the viewpoint of simplification of the structure of the shift lever and control accuracy.

The hydraulic pressure thus introduced is outputted into each clutch such that the transmission is turned into a state indicated by each of ranges of parking (P), reverse (R), neutral (N), and forward or speed change (D) on the basis of an operating position of the shift lever.

In this embodiment, it is important that, when the hydraulic pressure is introduced from the manual spool valve 10 into a hydraulic control valve 12-a for governing the hydraulic pressure applied to the R/C 3 and F/C 4, the hydraulic pressure is returned again from an output hydraulic line 22 provided to the manual spool valve chamber 11 into the manual spool valve 10. With this configuration, the two clutches, R/C 3 and F/C 4, can be controlled only by the hydraulic control actuator 15-a.

In this case, a hydraulic line switching means 17 for switching hydraulic pressure introducing lines communicated to the two clutches, R/C 3 and F/C 4, from each other is required to be provided for the manual spool valve 10 and the manual spool valve chamber 11. The hydraulic line switching means 17 includes the manual spool valve 10; an input hydraulic line 18 for introducing a hydraulic pressure (indicated by character C) from the hydraulic control valve 12-a into the manual spool valve 10; a hydraulic line 19 for supplying a hydraulic pressure (indicated by character D) from the input hydraulic line 18 into the F/C 4; a hydraulic line 20 for supplying a hydraulic pressure (indicated by character E) to the R/C 3; an output hydraulic line 22 for returning again a hydraulic pressure (indicated by character B) into the manual spool valve 10; and the manual spool valve chamber 11 connected to these hydraulic lines. The manual spool valve chamber 11 is also provided with a relief valve 21 for controlling the upper limit of the hydraulic pressure generated by the oil pump 2. The provision of the relief valve 21 prevents an excessive rise in hydraulic pressure, thereby preventing breakage of the hydraulic control apparatus 8.

The control of the hydraulic pressures applied to the R/C 3 and F/C 4 is carried out for preventing a variation in torque of an output shaft of the transmission upon N-D, N-R speed change, thereby providing good ride (which will be described later with reference to FIG. 5). Such a control logic is stored in a ROM (Read Only Memory, not shown) provided in the transmission controller 16, and an N-D speed change switch and an N-R speed change switch (both, not shown) are provided on the shift lever for controlling the hydraulic pressure using a signal supplied from each of these switches as a trigger.

The hydraulic control apparatus 8 also includes a fail-safe mechanism. When the control system including the transmission controller 16 and the electromagnetic solenoid 14 fails, the fail-safe mechanism allows the automobile to run with the speed change ratio being fixed at the third speed range. To fix the speed change ratio at the third speed range, the hydraulic pressures must be supplied to the F/C 4 and H/C 6 when a solenoid power supply is turned off. For this purpose, in electromagnetic solenoids 14-a, 14-c, the arrangement of hydraulic pressure introducing lines 30-a, 30-c and drain lines 31-a, 31-c is reversed to the arrangement of hydraulic pressure introducing lines 30-b, 30-d and drain lines 31-b, 31-d in the other electromagnetic solenoids 14-b, 14-d. In this case, there may be used the electromagnetic solenoids 14-a to 14-d which have the same specification in which the stroke becomes zero when the solenoid power supply is turned on. The electromagnetic solenoids 14-a to 14-d can be thus unified.

The purpose of fixing the speed change at the third speed range can be achieved not only by changing the hydraulic lines as described above but also by the use of two kinds of electromagnetic solenoids 14-a, 14-c, and 14-b, 14-d which are reversed to each other in operational characteristics, that is, different from each other in that the stroke becomes zero or it is maximized when the solenoid power supply is turned on. Further, there is provided a function for supplying a hydraulic pressure from the hydraulic line 20 for the R/C 3 into a fail-safe valve 34 and cutting-off the supply of a hydraulic pressure into the H/C 6 upon reverse movement in the case where the control system is in the failing state. As a result, the vehicle is allowed to run forward or reversely somewhat, for example, to a repair shop by operation of the manual spool valve 10.

Figure 2:
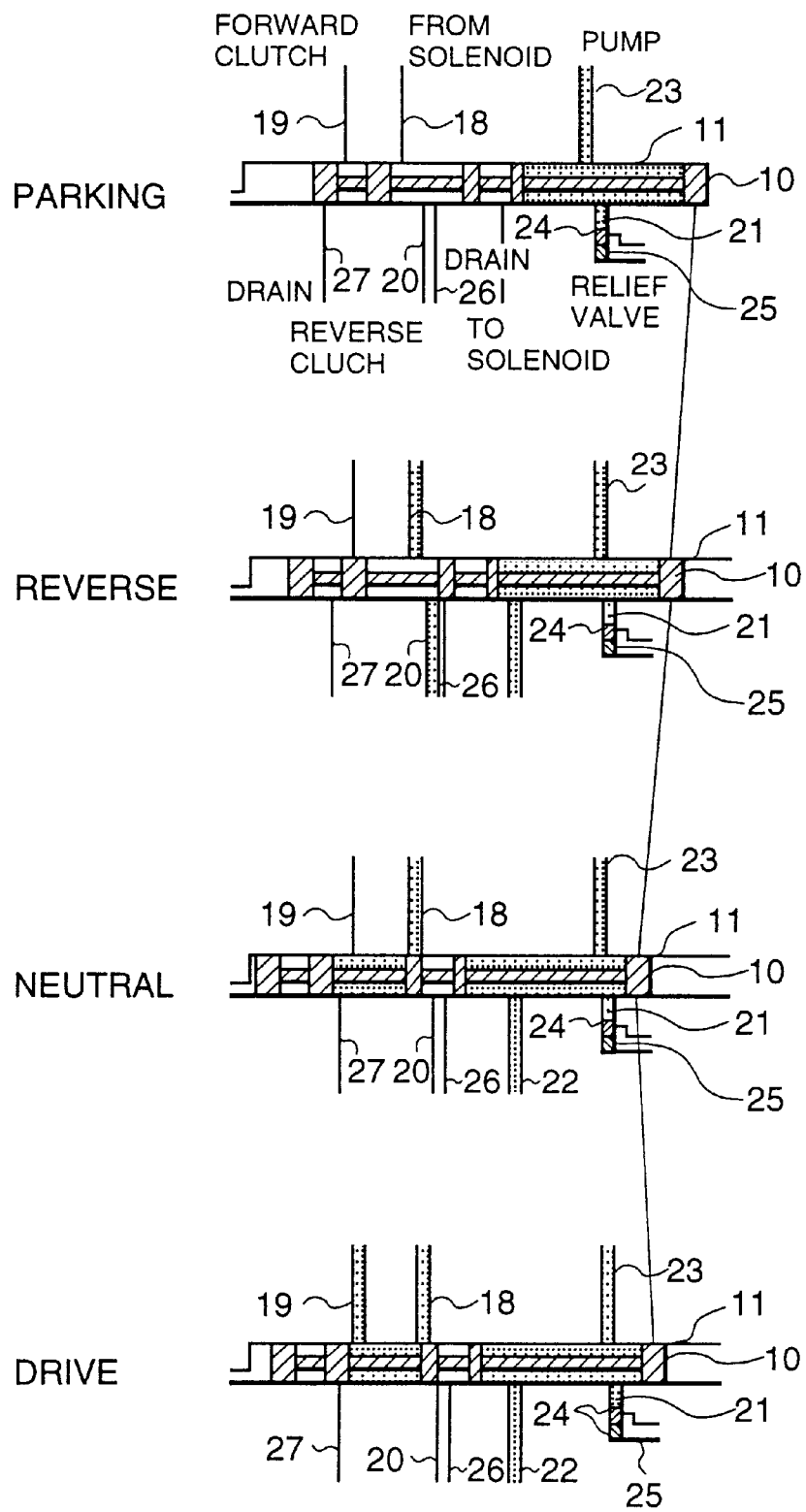
FIG. 2 is a typical view showing a principle of supplying a hydraulic pressure by a manual spool valve.

FIG. 2 is a typical view showing a principle of supplying a hydraulic pressure by the manual spool valve 10.

In this figure, hydraulic pressure supplying states at ranges of parking (P), reverse (R), neutral (N), and forward or speed change (D) are shown from the upper side in this order.

In the parking range, a hydraulic pressure is introduced from the pump pressure input hydraulic line 23 into the manual spool valve chamber 11. When the introduced hydraulic pressure becomes excessively large, the above-described relief valve 21 composed of a valve 24 and a spring 25 is operated for controlling the introduced hydraulic pressure to be less than the maximum setting value. The maximum setting value is determined on the basis of a previously selected biasing force of the spring 25.

In the reverse range, the manual spool valve 10 is moved leftward, so that the hydraulic pressure supplied from the pump pressure input hydraulic line 23 is outputted from the output hydraulic line 22. The hydraulic pressure is introduced into the input hydraulic line 18 through the hydraulic control valve 12-a. Then, the hydraulic pressure supplied from the input hydraulic line 18 is outputted to the hydraulic line 20 communicated to the R/C 3 for controlling the R/C 3.

In the neutral range, the manual spool valve 10 is further moved leftward, so that the hydraulic pressure supplied from the pump pressure input hydraulic line 23 is outputted from the output hydraulic line 22 and is then introduced into the input hydraulic line 18 through the control valve 12-a. However, since the hydraulic pressure in the input hydraulic line 18 is cut-off by the manual spool valve 10, it is not introduced to the clutch. At this time, the hydraulic pressure supplied to the R/C 3 is discharged from the hydraulic line 20 through a drain line 26, with a result that the neutral state is established.

In the forward or speed change range, the manual spool valve 10 is moved rightward from the position in the neutral state, so that the hydraulic pressure supplied from the input hydraulic line 18 is outputted from the hydraulic line 19 communicated to the F/C 4 for controlling the F/C 4. In the case where the manual spool valve 10 in this state is moved into the position in the neutral state, the hydraulic pressure supplied to the F/C 4 is discharged from the hydraulic line 19 through a drain line 27, with a result that the neutral state is established.

As described above, according to the present invention, the two clutches, F/C 4 and R/C 3, can be controlled only by one manual spool valve 10. This is effective to reduce the size and cost of the control apparatus. In the case where the hydraulic control actuator 15-a for controlling the F/C 4 and R/C 3 fails, a variation in torque upon N-D, N-R speed change is increased; however, the vehicle is allowed to run temporarily, for example, to a repair shop by the hydraulic control shown in FIG. 2.

Figure 3:
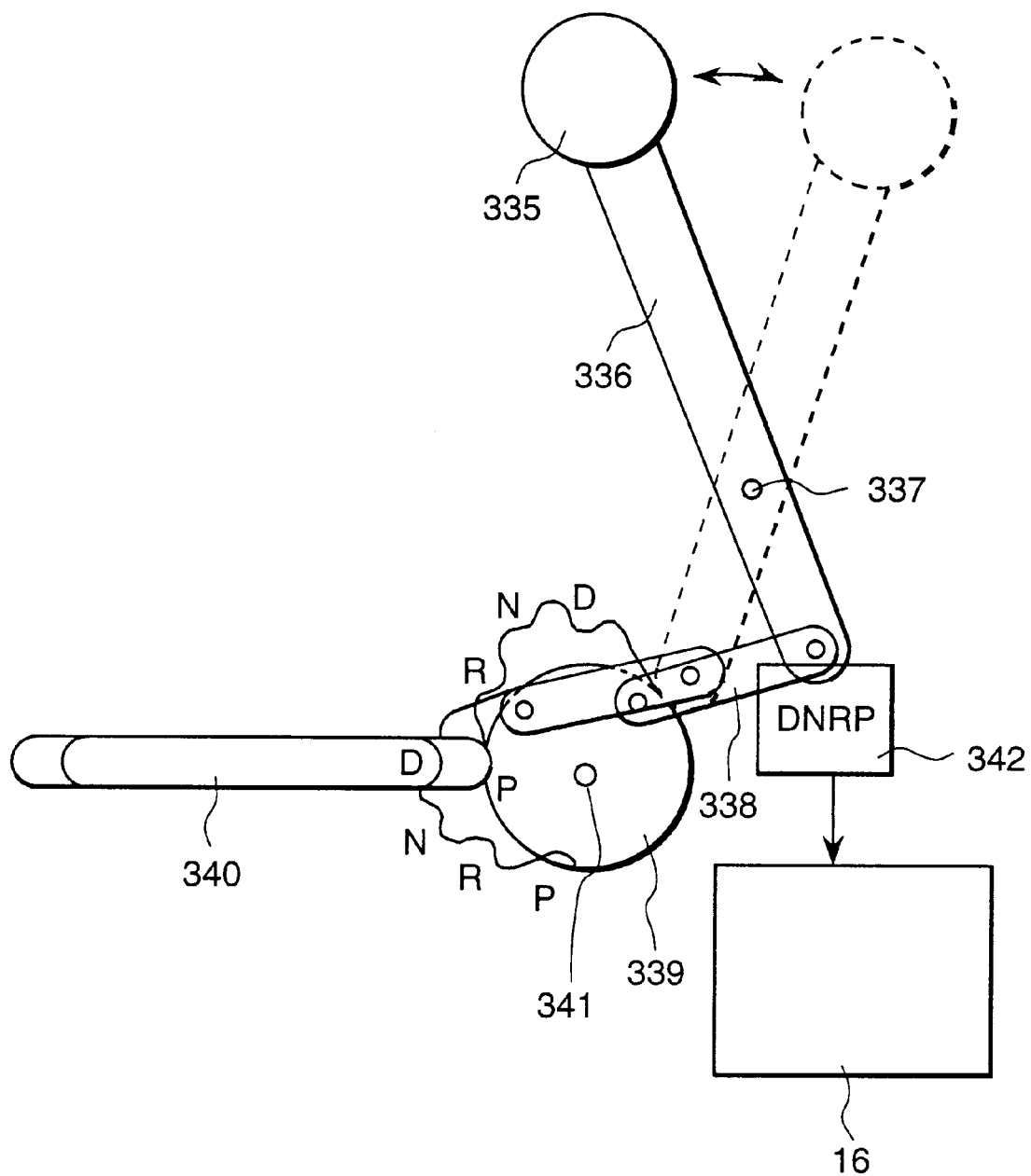
FIG. 3 is a view showing a configuration of a shift lever mechanism portion.

FIG. 3 is a view showing a configuration of a shift lever mechanism portion. The shift lever mechanism portion functions to operate the manual spool valve 10 in the right and left direction as shown in FIG. 2. It includes a shift lever composed of a shift knob 335, a lever 336, and a rotating shaft 337; and a connecting portion 338, a cam 339, a push rod 340, and a cam shaft 341, which are provided on the shift lever.

When the shift knob 335 is moved in the right and left direction in FIG. 3, the connecting portion 338 is turned around the rotating shaft 337 and thereby the cam 339 is turned around the cam shaft 341. The cam 339 has recesses which correspond to the P, N, R, and D ranges related to the stroke of the manual spool valve 10. The position of the manual spool valve 10 is determined by fixing the position of the push rod 340 in each of the recesses. In the case where the manual spool valve 10 is electrically operated, a leading edge of the lever 336 is detected by a switch 342 for checking each of the P, N, R, and D ranges; the signal is supplied to the transmission controller 16; and the electromagnetic solenoid 14-e is driven by the transmission controller 16, to thereby control the manual spool valve 10.

Figures 4, 5:
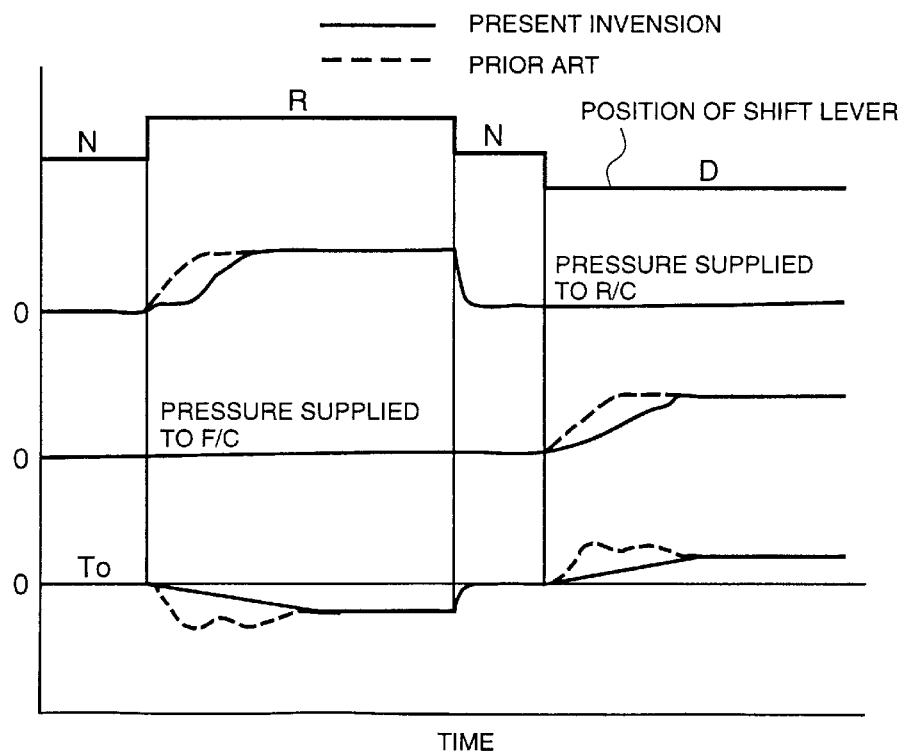
FIG. 4 is a correlation diagram showing a relationship between positions of a shift lever and operational states of clutches.
FIG. 5 is a correlation diagram showing a relationship between hydraulic pressures upon N-R, N-D speed change and a torque To of an output shaft of the transmission.

FIG. 4 is a correlation diagram showing a relationship between speed change positions and operation of clutches. More specifically, there is shown a relationship between positions of the shift lever and engagement states of the clutches. In this diagram, a round mark indicates a clutch engagement state, and a blank space indicates a clutch release state. Upon 1–2 speed change, while not shown, a torque applied to the clutch becomes larger because of a large reduction ratio, with a result that the clutch is severely worn due to the excessive torque. In this embodiment, to cope with such an inconvenience, a low one-way clutch (hereinafter, referred to as a "LO/C") is used. The LO/C is small in size and weight, and thereby it contributes to reduction in size and weight of the transmission. In the case where the LO/C is not used, one set of hydraulic control actuator 15 used for controlling the clutches must be added.

Referring to FIG. 4, in the N and P ranges, all of the clutches are turned off, that is, in the release states. In the D range, at the first speed range, the F/C and LO/C are turned on, that is, in the engagement states; at the second speed range, the F/C and 2–4/C are turned on; at the third speed range, the F/C and H/C are turned on; and at the fourth speed range, the H/C and 2–4/C are turned on. In the R range, the R/C is turned on.

FIG. 5 is a correlation diagram showing a relationship between hydraulic pressures upon N-R, N-D speed change and a torque To of an output shaft of the transmission. The torque To of the output shaft of the transmission means an output torque of the output shaft of the transmission main body 1. When the shift lever positional signal N, R or D representing a speed change range is inputted to the transmission controller 16, the hydraulic control shown in FIG. 5 is carried out for controlling the torque To. The shift lever signal can be simply obtained using a switch for converting a position of the shift lever into an electric signal. Such a switch is required for not only the case of electrically driving the manual spool valve 10 but also the case of manually driving the manual spool valve 10.

Referring to FIG. 5, when the position of the shift lever is changed between the N range and R range and between the N range and D range, the prior art apparatus shows characteristics indicated by broken lines. More specifically, in the prior art apparatus, a variation in torque To becomes large upon N-R, N-D speed change. This is because the prior art mechanical control system is difficult to perform fine control due to an action accompanied by an inertia, so that there occurs a variation in pressure supplied to each of the R/C and F/c as indicated by the broken line in FIG. 5. On the contrary, according to the present invention, since a pressure supplied to each of the R/C and F/C is electrically finely controlled as shown by a solid line in FIG. 5, the torque To has a smooth characteristic, thus relaxing a uncomfortable feeling due to the variation in torque.

Figure 6:
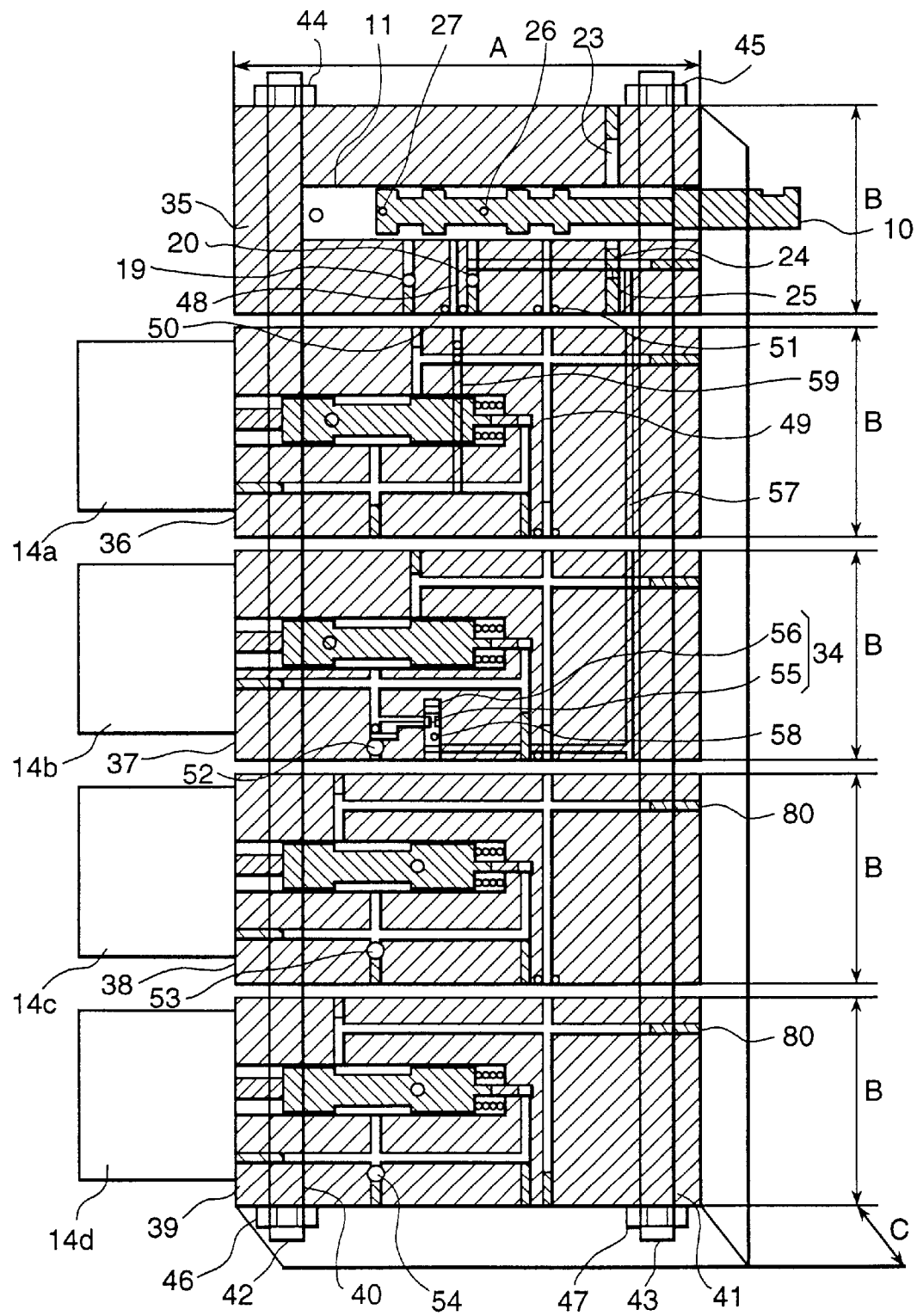
FIG. 6 is a view showing the detailed configuration of the hydraulic control apparatus shown in FIG. 1.

FIG. 6 is a view showing the detailed configuration of the hydraulic control apparatus 8 shown in FIG. 1. Here, there will be described the configuration intended to simplify the structure and reduce the cost of the hydraulic control apparatus 8. First, the manual spool valve 10 and the manual spool valve chamber 11 are unified to form a casing as a spool valve unit 35; and the electromagnetic solenoid 14, the hydraulic control valve 12, and the hydraulic control valve chamber 13 are unified to form each of control valve units 36, 37, 38, and 39. These units are then assembled into the hydraulic control apparatus 8 for controlling the transmission. In this case, the hydraulic control apparatus 8 can be easily assembled at a low assembling cost by setting these units to be identical to each other in terms of each of three (lateral, longitudinal, height) dimensions A, B, and C. Further, by use of the units having the same shape, the production cost can be also reduced.

These units are assembled by stacking the units and fastening them to each other using bolts 42, 43 passing through bolt holes 40, 41 previously formed in the units and nuts 44, 45, 46, 47 screwed with both ends of the bolts 42, 43. Connecting portions of, for example, hydraulic lines 48, 49 between the adjacent ones of the units are airtightly sealed by seal rings 50, 51. The lateral width A of the control valve units 36, 37, 38, 39 can be shortened by suitable arrangement of the hydraulic lines. In addition, the units may not identical to each other in terms of all of the three dimensions A, B and C, but may be identical to each other only in one or two of the three dimensions A, B, C.

The fail-safe function of the apparatus shown in FIG. 1 will be more fully described below. In FIG. 1, for reverse movement, when the manual spool valve 10 is moved to a position corresponding to the R range, a hydraulic pressure is supplied to the hydraulic line 20 for introducing the hydraulic pressure to the R/C 3. At this time, the hydraulic pressure is also supplied to a hydraulic line 52 for introducing the hydraulic pressure to the H/C 6. The fail valve 34 shown in FIG. 1 is provided for preventing such an inconvenience, and it is composed of a hydraulic valve 55 and a spring 56 in the control valve unit 37 in the configuration shown in FIG. 6.

The operation of the fail-safe valve 34 will be described. When the hydraulic pressure is supplied to the R/C 3, the hydraulic pressure is supplied to the lower side of the hydraulic valve 55 (see FIG. 6) through a hydraulic line 57, and the hydraulic valve 55 is moved upward in FIG. 6, to discharge the hydraulic pressure supplied to the H/C 6 to a drain line 58. The hydraulic lines 52, 53, and 54 of the control valve units 37, 38, and 39 intrduce the hydraulic pressure to the clutches respectively.

Each hydraulic line is formed into a straight shape, and a stopper for preventing oil leakage is provided near the outer peripheral portion thereof. This contributes to reduction in production cost of the hydraulic control apparatus 8.

With this configuration, an inexpensive hydraulic control apparatus having a fail-safe mechanism can be realized. Additionally, in the case where five speed change steps are required, one control unit which is the same as the control valve unit 37 without the drain line 58 and the fail-safe valve 34 may be added to the configuration shown in FIG. 6, to thereby obtain a hydraulic control apparatus for five-speed change. It is same way that one control unit which is the same as the control valve unit 36 without a hydraulic line 59 may be added to the configuration.

The present invention can be applied to a CVT (Continuously Variable Transmission). The CVT basically includes a tapered drive pulley for receiving an engine drive force, a tapered driven pulley for outputting a drive force to drive wheels, and a belt wound around the drive pulley and the driven pulley, wherein the speed change is achieved by changing a ratio between diameters of the drive pulley and the driven pulley around which the belt is wound.

Figure 7:
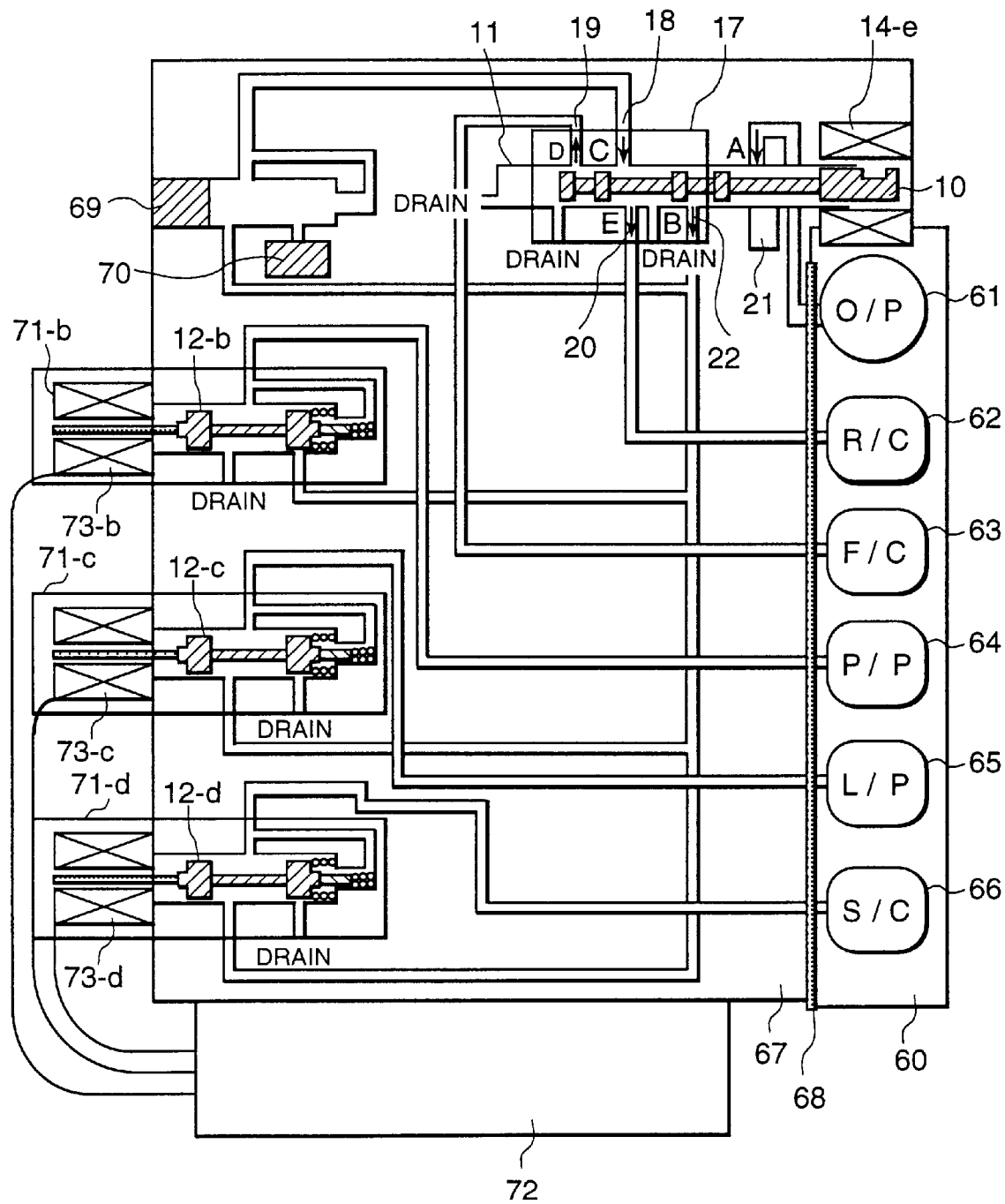
FIG. 7 is a view showing a schematic configuration of a hydraulic control apparatus for a CVT.

FIG. 7 is a view showing a schematic configuration of a hydraulic control apparatus for a CVT.

Referring to FIG. 7, a transmission main body 60 includes an oil pump (hereinafter, referred to as an "O/P") 61 for generating a hydraulic pressure; a reverse clutch (R/C) 62 turned on for reverse movement; a forward clutch (F/C) 63 turned on for forward movement; a pulley pressure supplying portion (P/P) 64 for axially moving a pulley for speed change; a line pressure generating portion (L/P) 65 for keeping a high accurate speed change ratio and managing a tension of a belt, and a starting clutch (S/C) 66 turned on for starting into forward or reverse movement. Also, there is provided a hydraulic control apparatus 67 for controlling hydraulic pressures used for operating these clutches. The transmission main body 60 is connected to the hydraulic control apparatus 67 through an interface board 68. The use of the interface board 68 reduces the production cost of the hydraulic control apparatus 67. The reason for this is as follows. Even if design factors (the entire shape thereof, positions of portions for introducing a hydraulic pressures to clutches, and the like) of the transmission main body 60 are not matched with design factors (the arrangement of outlets of hydraulic lines) of the hydraulic control apparatus 67, the same hydraulic control apparatus 67 can be matched with the transmission main body 60 by changing the shape of the interface board 68 in accordance with the kind of the transmission main body 60.

The hydraulic control apparatus 67 will be described in detail below. The hydraulic control apparatus 67 is similar in basic configuration to the hydraulic control apparatus 8 shown in FIG. 1. A manual spool valve 10 in this apparatus 67 is the same as that shown in FIG. 1, and therefor, the explanation thereof is omitted. The hydraulic control apparatus 67 is different from the hydraulic control apparatus 8 in the configuration of a control portion for a R/C 62 and a F/C 63. In the case of the CVT, the control of the R/C and F/C for suppressing a variation in torque upon starting as shown in FIG. 5 is not required, so that an electromagnetic solenoid is not used upon switching the R/C and F/C from each other by operation of the manual spool valve 10. Accordingly, the R/C and F/C can be switched from each other using a configuration that the hydraulic control actuator 15-a is omitted from the hydraulic control apparatus 8 shown in FIG. 1 and only stoppers 69, 70 are provided. In this case, the control valve unit 36 shown in FIG. 6 can be used, that is, the control valve unit for the four speed transmission can be commonly used. This is effective to reduce the design and production costs.

Referring to FIG. 7, for operating the P/P 64, L/P 65 and S/C 66, a hydraulic pressure supplied from an output hydraulic line 22 is supplied to hydraulic control actuators 71-b, 71-c, 71-d. The hydraulic pressure thus supplied is governed by electromagnetic solenoids 73-b, 73-c, 73-d operated on the basis of control signals supplied from a CVT controller 72, to operate respective clutches, thereby realizing running and speed change of the CVT.

The hydraulic control apparatus 67 also includes a fail-safe mechanism. When the control system including the CVT controller 72 and the electromagnetic solenoid 73 fails, the fail-safe mechanism functions to fix the speed change ratio on a relatively small side (that is, speed increasing side of the pulley) for allowing the automobile to run temporarily, for example, to a repair shop. The setting is performed such that the case where the hydraulic pressure supplied to the P/P 64 is large is taken as a speed decreasing side and the case where it is small is taken as a speed increasing side. To fix the speed change ratio, it is required that when a solenoid power source is turned off, the supply of the hydraulic pressure to the P/P 64 is stopped and the hydraulic pressure is supplied to the L/P 65 and S/C 66. For this reason, the control valve unit 38 is used for the P/P 64, and the basic control valve unit 37 (not containing a fail-safe valve 34) is used for the L/P 65 and S/C 66. In this case, electromagnetic solenoids 73 for driving hydraulic control valves 12 can be configured to have the same specification in which the stroke becomes zero when the solenoid power supply is turned on.

FIG. 8 is a correlation diagram showing a relationship between positions of a shift lever and engagement of CVT clutches and supply of a hydraulic pressure to a pulley. A round mark indicates a state in which a hydraulic pressure is supplied, and a blank space indicates a state in which any hydraulic pressure is not supplied. In the N and P ranges, hydraulic pressures are supplied to the P/P and L/P in consideration of responsiveness upon starting; however, since the S/C is turned off, the automobile does not start. In the D range, hydraulic pressures are supplied to the F/C and S/C, to turn on the clutches, with a result that the automobile starts for forward movement. In this range, the rotating ratio between the two pulleys is changed to carry out speed change by control of the hydraulic pressures supplied to the P/P and L/P. In the R range, a hydraulic pressure is not supplied to the F/C but is supplied to the R/C, so that the automobile starts for reverse movement. Here, since the hydraulic pressures are also supplied to the P/P and L/P, the speed change ratio upon reverse movement can be changed by control of the hydraulic pressures supplied to the P/P and the L/P.

As described above, according to the present invention, a hydraulic control apparatus used for a steppedly variable transmission or continuously variable transmission can be simplified, so that it can be produced at a low cost. Further, since a variation in torque upon N-D, N-R speed change can be suppressed, the operational ability of the automobile can be improved. In addition, since the hydraulic control apparatus includes a fail-safe function allowing the automobile to run to a repair shop when a control system fails, it becomes possible to enhance the safety.

What is claimed is:

1. A hydraulic control apparatus for an automatic transmission, comprising:

a speed change mechanism having a forward clutch configured to be turned on when a speed change lever is shifted from a neutral position to a forward position, and a reverse clutch configured to be turned on when the speed change lever is shifted from the neutral position to a reverse position;

a spool valve configured to be driven by operation of the speed change lever, and a spool valve chamber for the spool valve;

a hydraulic control actuator arranged to adjust a hydraulic pressure generated by a hydraulic pump driven by an engine drive force or an electric force for controlling an engagement state of said forward clutch or said reverse clutch of said speed change mechanism; and said spool valve chamber is provided with a supply hydraulic line into which a hydraulic pressure is supplied from the hydraulic pump, an output hydraulic line for outputting the hydraulic pressure supplied from said introducing hydraulic line through said spool valve, and an input hydraulic line for supplying again the hydraulic pressure from said output hydraulic line to said spool valve, whereby said forward clutch and said reverse clutch are controlled using the hydraulic pressure supplied to said input hydraulic line.

2. A hydraulic control apparatus for an automatic transmission according to claim 1, wherein a hydraulic control valve is provided between said output hydraulic line and said input hydraulic line of said spool valve chamber for adjusting the hydraulic pressure applied to said forward clutch and said reverse clutch; and an electromagnetic solenoid is provided to drive said hydraulic control valve.

3. A hydraulic control apparatus for an automatic transmission according to claim 2, wherein a stopper for preventing oil leakage is provided in lieu of a valve chamber of said hydraulic control valve.

4. A hydraulic control apparatus for an automatic transmission according to claim 2, comprising a spool valve unit composed of said spool valve and said spool valve chamber, and a control valve unit composed of said electromagnetic solenoid and said hydraulic control valve.

5. A hydraulic control apparatus for an automatic transmission according to claim 4, wherein a plurality of said control valve units are freely combined with each other.

6. A hydraulic control apparatus for an automatic transmission according to claim 4, wherein said spool valve unit and said control valve unit, comprise casings identical to each other in at least two dimensions.

7. A hydraulic control apparatus for an automatic transmission according to claim 4, wherein said spool valve is provided with apparatus for switching said hydraulic lines from each other.

8. A hydraulic control apparatus for an automatic transmission according to claim 1, wherein an electromagnetic solenoid is provided to drive said spool valve.

9. A hydraulic control apparatus for an automatic transmission according to claim 1, wherein said spool valve chamber is configured such that said input hydraulic line is positioned between a hydraulic line for supplying a hydraulic pressure to said forward clutch and a hydraulic line for supplying a hydraulic pressure to said reverse clutch.

* * * * *